April 6, 1943. H. BACH 2,315,577
TREATMENT OF SLUDGE
Filed July 7, 1939
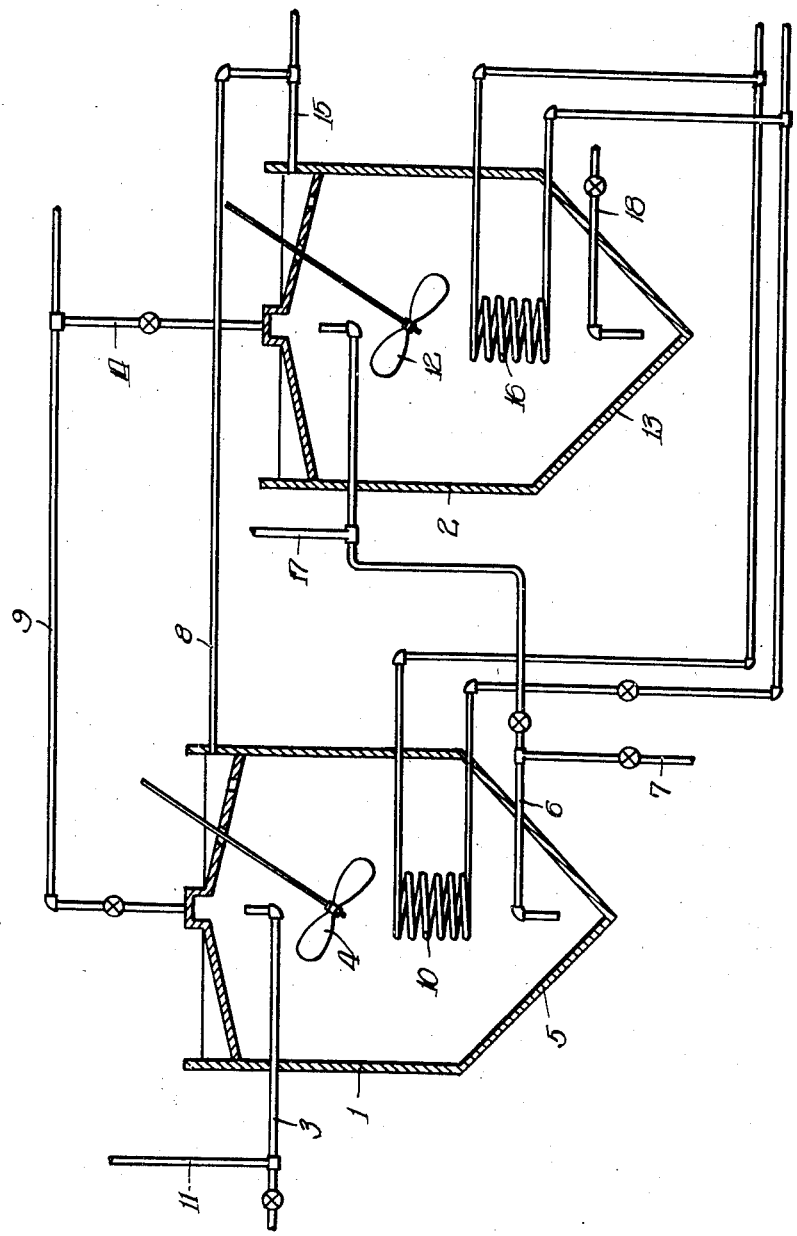
INVENTOR.
Hermann Bach Patented Apr. 6, 1943

2,315,577

UNITED STATES PATENT OFFICE 2,315,577

TREATMENT OF SLUDGE

Hermann Bach, Berlin, Germany, assignor to Infilco Incorporated, a corporation of Delaware Application July 7, 1939, Serial No. 283,262

3 Claims. (Cl. 210—2)

This invention relates to the treatment of sludge derived from municipal sewage, industrial waste and similar polluted liquids and in particular to the anaerobic digestion of sludge so derived. The treatment of sewage sludge is illustrative and will be hereinafter referred to for exemplification, it being understood that such material may comprise what is known as raw sludge, activated sludge, chemically precipitated sludge, screenings and other similar components, in various proportions.

The general function and object of digestion is to promote within a controlled space, biochemical disintegration of certain organic compounds of complex molecular structure which are contained in the sludge and which are largely of proteineous character. Such disintegration generally results in the formation of simpler compounds which as a rule are more stable; and to some extent, substances are split into basic elements. Incident to such disintegration a large proportion of organic compounds are converted into inorganic or mineral matter, and for this reason the process is also referred to under the term mineralization. Digested sludge is relatively easy to be dehydrated and otherwise to be handled mechanically due to the liberation of water incident to the destruction of water-binding colloids and the like. Also digested sludge in general comprises only a fraction of the volume and weight of sludge initially present, the remainder being converted into supernatant liquid and various gases.

A large percentage of the gases formed in sludge digestion consist in methane which in proper mixture with air constitutes a valuable fuel for generation of heat and power. In this way a part or in some instances the entire sewage digestion process may become a self contained operation. Furthermore, in some cases fertilizer or other values can be produced from the solid product of sludge digestion, with or without further treatment of the same. Where this is feasible the cost of operation is further reduced.

However, such inexpensive or profitable operation is had at the cost of large investments for construction and erection of digester tank and equipment. A few years ago it was regarded as a matter of course that digestion of sewage sludge of the ordinary kind required a detention period of about three months as a yearly average. In order to afford such a detention period for the tremendous amount of sludge to be treated, tank space of considerable volume had to be excavated or constructed and equipment of corresponding dimensions had to be installed.

A marked improvement was achieved several years ago when digestion units of the kind discussed for the first time were provided with heating equipment. Such equipment is now in general use. It ordinarily consists in a hot water system comprising a boiler heated with digester gas and a heat exchanging coil in the digester. By such means a digester unit can be kept at a controlled temperature, the range of about 70 to 85 degrees F. being preferred. During the summer this range can be ordinarily maintained without artificial heating in the moderate climate then prevailing throughout most of the United States. In the winter the heating system has to be operated at varying rates. The temperature range mentioned is favorable for the life of so called mesophilic bacteria, that is bacteria which thrive in the range of moderate temperatures and which promote sewage digestion. The temperature itself is known as mesophilic. Average digestion periods have been reduced by considerable fractions, in some cases by as much as 50% or more, upon the introduction of heating means to maintain mesophilic temperatures.

It has also been known for several years that temperatures immediately above or below the mesophilic range result in poorer bacterial action and digestion but that the range from about 120 to 135 degrees F., the so called thermophilic range, again is favorable to certain other groups of digesting bacteria and promotes the activity of the same. Temperatures between the mesophilic and thermophilic ranges constitute a more or less inactive space with respect to sludge digestion. As might be expected with the high temperature applied, the biochemical reaction in the thermophilic range proceeds rapidly; it is substantially completed within a much shorter period than the mesophilic reaction. The system in most cases can still be self sufficient or almost self sufficient as to production of fuel, and the additional expense for heat insulation, hot water circulation etc. which may be required is generally offset or more than offset by the reduction in tank space. Unfortunately, however, sludge digestion under thermophilic conditions is unsatisfactory in other respects of paramount importance. Apparently thermophilic bacteria fail to sufficiently disintegrate, dehydrate or otherwise affect certain colloid substances, and the like. Such bacteria, or their environments, may even form harmful substances part of which may be more troublesome than the raw material. At any rate the resulting sludge drains poorly and smells badly. The difficulty involved in dehydrating this sludge, for ultimate disposal, has so far prevented practical use of the thermophilic system.

It has been proposed a few years ago to overcome this difficulty by providing thermophilic digestion followed by mesophilic action so as to have the benefit of rapid action in the thermophilic stage and afterwards to correct the errors or supplement the results thereof. Actual experiences along such lines are insufficient as yet to form a final judgment regarding the same. However, the following should be considered.

Sewage sludge generally consists of unstable materials. Decomposition of some of these materials develops violently or rapidly, whereas other parts require considerable time and bacterial energy in order to be mineralized. Initially both types of matter are present in abundance. Most of the easily digestible matter will be attacked by thermophilic as well as mesophilic bacteria; it is impossible to assign any specified group of compounds to be primarily or exclusively attacked by any particular group of bacteria. Applying the high bacterial energy of the thermophilic process at this stage is unsound. It means partly wasting such energy on the comparatively simple task of destructing the easily splitting compounds; and it may even mean leaving to the mesophilic organisms part of the more difficult work of decomposing the remaining and more stable materials.

The object of my invention is to provide a more efficient and a more economical treatment.

For this purpose I propose a process and system initially providing for mesophilic digestion and completing the same under thermophilic conditions, as hereinafter described in detail.

An example illustrating a preferred manner of carrying out my improved process comprises mesophilic digestion of raw sludge for about seven to ten days, supernatant and gases being withdrawn, followed by thermophilic digestion of the resulting sludge for about five to seven days, at the end of which the remaining sludge emerges in mineralized condition.

In the mesophilic stage the temperature is substantially maintained at about 70 to 85 degrees F., and preferably the liquid and solid materials are stirred continuously or in suitable intervals, gas is removed, the pH is controlled and the process is otherwise promoted by operations known to the art.

The exact duration of the first stage, of course, depends on the kind of sludge, its composition, concentration, etc. The period stated is for illustration only. The proper first stage period may be found by a preliminary test. A sample of the particular sludge to be digested is set up under proper anaerobic mesophilic conditions to ascertain how long it takes for the evolution of methane to reach its highest activity and to decrease. In actual operation the sludge is transferred to thermophilic surroundings at the approximate time that the evolution of gas under mesophilic conditions begins to fall off.

The success and duration of the second stage treatment again depends on variables, substantially as mentioned with respect to the primary stage. The second stage is either carried to completion or in a modified process, to a point where mesophilic treatment may be once more applied in order to avoid or offset undesirable side effects of the secondary, thermophilic treatment. Such undesirable effects obviously will be less than in earlier thermophilic processes but may still develop to some extent even during the short duration of the secondary stage as here applied on substances not mineralized by the primary process.

The total time required for my improved primary and secondary digestion, as applied to typical sewage sludge, will be approximately 15 days, more or less, with limitations and reservations as hereinabove stated.

A preferred system for carrying out my improved process is diagrammatically shown in the sole figure of the drawing attached.

The numeral 1 stands for a primary, mesophilic digester, of size and construction which will be obvious to persons skilled in this art, from the above description of the process. The numeral 2 designates a secondary, thermophilic digester, constructed and dimensioned in accordance with similar obvious principles.

Sewage sludge to be digested is withdrawn from a clarifier or the like (not shown) through line 3, terminating in digester 1, where it is initially seeded by mixing with partly digested sludge induced by operation of agitator 4. The agitator also serves to stir the contents of digester 1, intermittently or continuously, in order to provide relative uniformity of bacterial action, to liberate gas, to break up large solids of floating scum or settling sludge and for other purposes well known to the art. Digested sludge will tend to subside to and to collect upon the bottom 5 which is shown as a steep hopper bottom allowing and causing gravitational separation of sludge from supernatant liquid, especially as long as agitator 4 is at rest. Accordingly, concentrated mesophilic sludge or any mixture thereof with supernatant liquid can be withdrawn through line 6 terminating in secondary digester 2. An emergency waste outlet 7 may be provided as shown. Supernatant and gas may be withdrawn from primary digester 1 as shown through lines 8 and 9 respectively. Heating means 10 may be provided in digester 1 to maintain mesophilic conditions. Chemicals may be added through line 11 joining inlet 3 in order to control the pH of material in digester 1 and to otherwise promote chemical and biochemical reactions therein.

Digester 2 may well be of smaller size than digester 1, this being in accordance with general principles stated according to which the secondary digester receives only a fraction of the volume of sludge fed into the primary tank, and the secondary detention period ordinarily will be shorter than the primary one. The secondary tank has agitator 12, sludge collecting hopper bottom 13 and gas and supernatant outlets 14 and 15 for purposes similar to those of the corresponding members 4, 5, 9, and 8 of tank 1. Tank 2 also has a heating coil 16 adapted to maintain thermophilic conditions in the tank. Suitable reagents may be added as through conduit 17 joining sludge line 6. Completely digested sludge will ordinarily be discharged from bottom 13 through line 18 leading to incineration means or other means of ultimate disposal (not shown).

The piping illustrated is equipped with suitable valves in manner obvious to persons skilled in this art. Other amplifications or modifications could be obviously applied both to the system and method described. All of these are intended to be covered by the following claims.

I claim:

1. A method of digestion as described comprising mesophilically digesting sludge in manner and for a period sufficient substantially to lead to a peak of gas evolution and thereupon subjecting the sludge to thermophilic digestion.

2. The process of digesting sewage sludge which comprises first maintaining raw sludge in a primary digestion zone, maintaining a uniform temperature of approximately 70 to 85 degrees Fahrenheit throughout said zone and then retaining said sludge in said zone until the evolution of gas therein has reached its point of declining production, then flowing said sludge into a thermophilic digestion zone, maintaining a uniform temperature throughout said thermophilic digestion zone of 120 to 135 degrees Fahrenheit, and withdrawing digested sludge to waste from said thermophilic digestion zone.

3. The process of digesting sewage sludge which comprises first maintaining raw sludge in a primary digestion zone for a period of seven to ten days while maintaining a uniform temperature throughout said zone of approximately 70 to 85 degrees Fahrenheit and then retaining said sludge in a secondary digestion zone for a period of five to seven days while maintaining a uniform temperature throughout said secondary zone of approximately 120 to 135 degrees Fahrenheit.

HERMANN BACH.